Patented Nov. 19, 1940

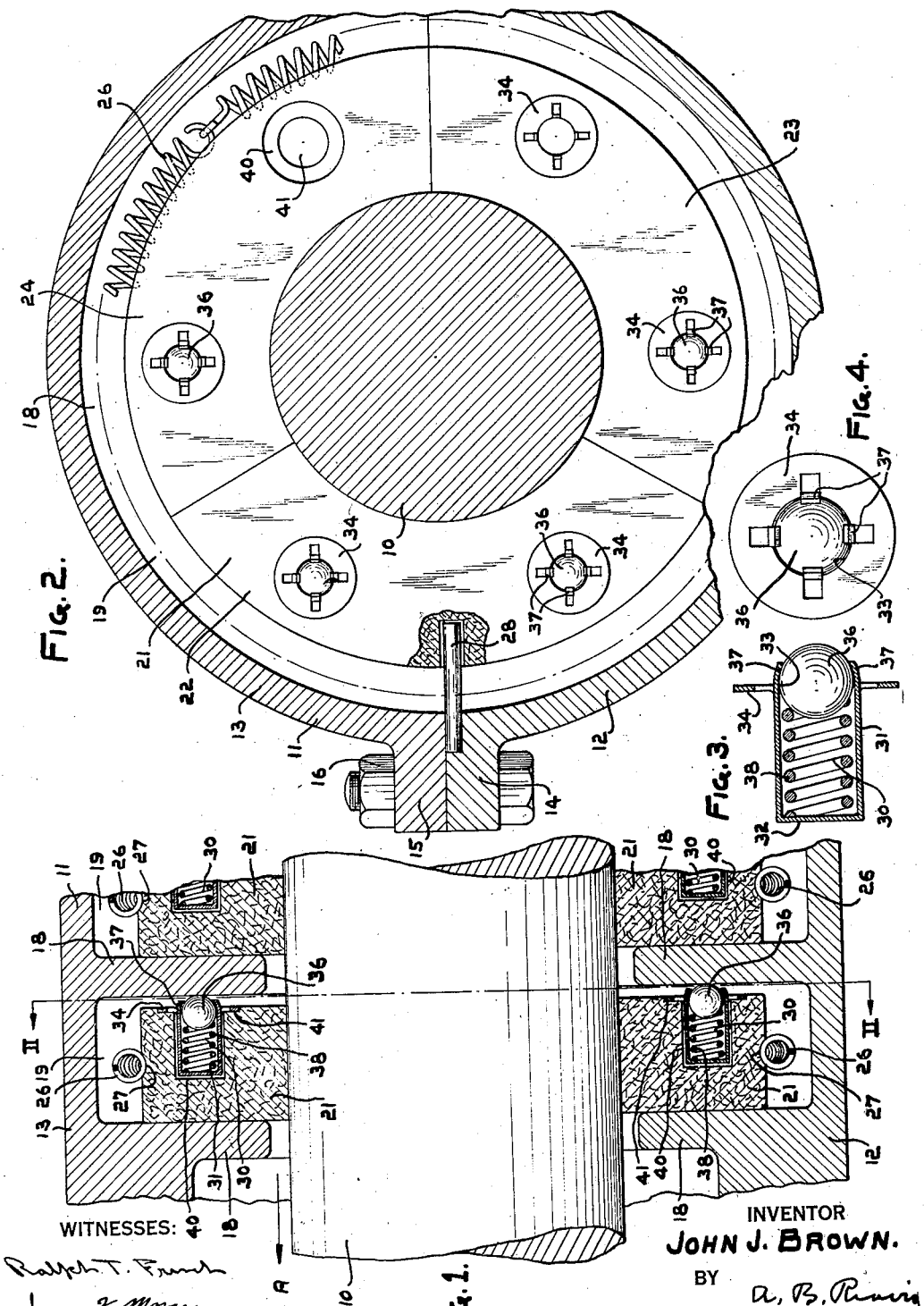

2,222,360

UNITED STATES PATENT OFFICE 2,222,360

CARBON RING SEAL

John J. Brown, Drexel Hill, Pa., assignor to Westinghouse Electric & Manufacturing Company, East Pittsburgh, Pa., a corporation of Pennsylvania Application December 9, 1938, Serial No. 244,733

2 Claims. (Cl. 286—22)

This invention relates to elastic fluid prime movers and more particularly to shaft seals therefor, and has for an object the provision of an improved carbon ring seal.

Heretofore, in sealing the ends of turbine rotors, it has been customary, with carbon ring glands, to have a casing surrounding the portion of the rotor to be sealed and spaced from the same, together with radial partitions carried by the casing and providing annular compartments for reception of the carbon sealing rings. In order to bias the rings to sealing engagement with the adjacent partitions, springs are placed between partitions and the rings at one side so that the other sides of the rings and partitions may have sealing engagement under pressure.

While the operation of this arrangement has been very satisfactory, difficulty has been encountered in assembly of the rotor, carbon rings and springs in the casing and its annular compartments.

The casing and its radial partitions are customarily divided along the horizontal centerline of the turbine to provide base and cover portions. In assembling, the rotor is positioned in the base of the casing, the carbon ring segments are assembled about the rotor, the garter springs are placed about the rings, and the casing cover is placed over the upper portion of the rotor assembly. During these steps, the carbon ring, with the axially projecting springs mounted therein, must be positioned in their respective annular compartments, necessitating compression of the springs until they are within the compartments. Due to the limited space and close clearances involved it has been difficult to make the assembly without damaging or displacing the springs.

The present invention contemplates the provision of a carbon ring sealing arrangement, together with a novel spring assembly therefor, which assembly includes a coil compression spring and a spherical friction-reducing contact element, together with a one-piece housing for the same, the spring tending to move the contact element outwardly through one end of the housing, and the latter including members integral therewith for limiting such outward movement. Preferably the housing has a wide flange for providing a relatively large area of contact between the housing and the carbon ring at the surface of the latter.

Therefore, another object of the invention is the provision of unitary spring assemblies for biasing carbon sealing rings to sealing position, and so constructed as to greatly simplify the operation of assembly of the rings and springs with respect to the annular compartments.

A further object of the invention is the provision of a novel spring assembly including a friction-reducing contact element and a housing for the parts.

These and other objects are effected by my invention as will be apparent from the following description and claims taken in connection with the accompanying drawing, forming a part of this application, in which:

Fig. 1 is a longitudinal sectional view of a portion of a turbine shaft and sealing structure at the high pressure end of the turbine, showing one embodiment of the invention;

Fig. 2 is a sectional view, taken along the line II—II of Fig. 1, looking in the direction of the arrows;

Fig. 3 is an enlarged longitudinal sectional view of the spring assembly; and,

Fig. 4 is an end elevational view of the structure shown in Fig. 3.

Referring now to the drawing, the numeral 10 indicates the shaft of a turbine rotor (not shown), the shaft being surrounded, in spaced relation, by the casing 11, which, as usual, is divided along the horizontal centerline of the turbine to provide a base portion 12 and cover portion 13 having flanges 14 and 15 at the meeting edges for the reception of suitable connecting means, such as the bolts 16.

The casing 11 is provided with radial partitions 18 dividing the space between the casing and the shaft into a plurality of annular recesses or compartments 19.

Each of the annular compartments 19 houses a carbon packing ring 21. Preferably, each packing ring is made up of segments such as 22, 23, and 24, held together by a garter spring 26 surrounding the same and fitting in a shallow peripheral groove 27. The garter spring holds the carbon ring sections in assembled relation and in close contact with the shaft 10. However, the ring does not contact the shaft closely enough to produce any undesirable friction. The rings are prevented from turning by the key member 28 (Fig. 2) positioned between the casing base and cover at the horizontal joint.

The arrow A in Fig. 1 indicates the direction in which leakage of steam from the high-pressure end of the turbine to the atmosphere and along the shaft 10 would occur. As it is the purpose of the carbon rings 21 to prevent, so far as possible, such leakage of steam, it is necessary to urge each carbon ring (at the high pressure end) against that face of the radial wall 18 of each compartment which is farthest from the source of steam. To this end, each ring is provided with a plurality of compression spring assemblies 30, of novel construction.

Each spring assembly is comprised by a cylindrical casing or housing 31 closed at one end by the wall 32 and open at the opposite end, as at 33. Integral with the housing 31 at the open end of the latter is a radially-extending flange 34. Within the housing and adjacent the open end thereof is a spherical contact member 36 retained in the housing by fingers 37 struck from the flange 34 and slightly overlying the open end 33 of the housing. A coil spring 38 under compression is positioned within the housing with one end abutting the end wall 32 and the other end engaging the spherical contact member 36 and urging the same outwardly of the housing, the outermost position of the contact member being limited by the fingers 37. Each of the carbon rings 21 is provided with a plurality of recesses 40 opening into that face of the ring which is disposed nearest to the source of steam, the recesses being counterbored at 41 for reception of the spring housing flanges 34. It will be noted (Fig. 1), that each recess 40 is of such depth that the closed end of the housing is spaced from the bottom of the recess whereby all of the pressure from the spring device is transmitted to the carbon ring, not only through the relatively large area contacted by the flange 34, but substantially the full thickness of the ring is used to transmit the sealing pressure with the result that weakened portions introduced by the recesses are not acted on directly by the springs and a stronger construction is preserved on that account. Preferably, the counterbore 41 is of such diameter that the flange 34 is closely received therein, in order to retain the housing in the carbon ring until assembly of the rings in the annular recess has taken place.

It will be obvious that, by the use of the construction and arrangement herein disclosed, the carbon rings, together with their spring assemblies and contact elements, may be easily assembled in the annular compartments without loss or displacement of the springs from the recesses or uneven seating of the contact ends thereof with the adjacent partition wall.

The rings are capable of being readily inserted in the recesses 19 by movement in a plane perpendicular to the longitudinal axis of the rotor, the balls 36 in the full extended positions being not so far out but that a partition wedges them back far enough to permit insertion by a continued push or pressure without any separate or special manipulation. Therefore, the rings may be readily positioned with respect to the rotor and lower half of the casing, after which the cover may be brought to position over the rings and lowered, the rings entering the lower portions of the compartments and the portions thereof wedging back the balls as the cover is brought to assembled position.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a prime mover, a shaft, a casing surrounding a portion of said shaft in spaced relation thereto; radially-extending partitions carried by the casing and dividing the space between said casing and the shaft into a plurality of annular compartments; a carbon sealing ring disposed in each of said compartments and closely embracing the shaft, each of said carbon rings having a plurality of spaced cylindrical recesses extending normal to, and disposed in, one radial face thereof; a cylindrical housing closed at one end and open at the other end positioned in each of said recesses with the closed end thereof spaced slightly from the bottom of the recess; an integral outwardly-directed radial flange at the open end of each housing abutting the recess-containing face of the carbon ring and constituting the sole housing support in axial direction; a spherical contact element in each housing adjacent the open end thereof; a coil spring under compression in each housing with one end abutting the closed end of the housing and the other end abutting the spherical contact element to urge the latter outwardly through the open end of the housing; and retaining means integral with the housing for limiting outward movement of said contact element, so that, with a ring engaging one wall of its compartment and being inserted parallel thereto, the edge of the other wall of the compartment will engage the spherical surface of the contact member to wedge the latter backwardly as the ring is pushed to final position.

2. In a prime mover, a shaft, a casing surrounding a portion of said shaft in spaced relation thereto; radially-extending partitions carried by the casing and dividing the space between said casing and the shaft into a plurality of annular compartments; a carbon sealing ring disposed in each of said compartments and closely embracing the shaft, each of said carbon rings having a plurality of spaced cylindrical recesses extending normal to, and disposed in one radial face thereof, said radial face being counterbored at the edge of each recess in concentric relation to the latter; a cylindrical housing closed at one end and open at the other end positioned in each of said recesses with the closed end thereof spaced slightly from the bottom of the recess and with the open end thereof flush with the edge of the recess; an integral outwardly directed radial flange at the open end of each housing and disposed in the counterbore and constituting the sole housing support in axial direction; a spherical contact element in each housing adjacent the open end thereof; a coil spring under compression in each housing with one end abutting the closed end of the housing and the other end abutting the spherical contact element to urge the latter outwardly through the open end of the housing; and retaining fingers integral with the housing and partially overlying the open end thereof for limiting outward movement of said contact element, so that, with a ring engaging one wall of its compartment and being inserted parallel thereto, the edge of the other wall of the compartment will engage the spherical surface of the contact member to wedge the latter backwardly as the ring is advanced to final position.

JOHN J. BROWN.